United States Patent [19]

Kondo et al.

[11] Patent Number: 5,138,208
[45] Date of Patent: Aug. 11, 1992

[54] SMALL SIZE ELECTRIC MOTOR

[75] Inventors: Tetsuji Kondo; Chiaki Sugano; Osamu Matsumoto, all of Hyogo, Japan

[73] Assignee: Mitsubishi Denki K.K., Tokyo, Japan

[21] Appl. No.: 717,153

[22] Filed: Jun. 18, 1991

[30] Foreign Application Priority Data

Jun. 20, 1990 [JP] Japan .................. 2-163225

[51] Int. Cl.⁵ .......................... H02K 5/18; H02K 5/02
[52] U.S. Cl. ......................................... 310/64; 310/89; 310/43
[58] Field of Search .............. 310/40 MM, 43, 89, 52, 310/64, 91; 361/381, 386, 388, 389

[56] References Cited

U.S. PATENT DOCUMENTS

| | | | |
|---|---|---|---|
| 3,685,926 | 8/1972 | Blum | 310/43 |
| 4,087,708 | 5/1978 | Laing | 310/64 |
| 4,129,796 | 12/1978 | Papst | 310/43 |
| 4,295,067 | 10/1981 | Binder et al. | 310/64 |
| 4,634,908 | 1/1987 | Sturm | 310/64 |
| 4,823,032 | 4/1989 | Ward et al. | 310/43 |
| 4,866,317 | 9/1989 | Katayama | 310/89 |

FOREIGN PATENT DOCUMENTS

| | | | |
|---|---|---|---|
| 1908656 | 9/1970 | Fed. Rep. of Germany | 310/89 |
| 0121108 | 10/1978 | Japan | 310/64 |
| 0202129 | 8/1989 | Japan | 310/89 |

Primary Examiner—Steven L. Stephan
Assistant Examiner—C. LaBalle
Attorney, Agent, or Firm—Sughrue, Mion, Zinn, Macpeak & Seas

[57] ABSTRACT

A small size electric motor comprises a motor housing having a built-in stator and secured to a supporting member. The motor housing is made of a synthetic resin and has a substantially tubular heat conductive plate embedded in a portion thereof which is attached to the supporting member. The heat conductive plate is made of a metallic material, and its inner peripheral portion is projecting toward the inner side of the housing so that the heat conductive plate is brought into contact with the stator, and its outer peripheral portion is exposed to the surface to which the supporting member is attached so that the heat conductive plate is brought into contact with the supporting member. Therefore, the heat generated by the motor is radiated while transmitted from the stator to the supporting member through the heat conductive plate.

1 Claim, 1 Drawing Sheet

SMALL SIZE ELECTRIC MOTOR

BACKGROUND OF THE INVENTION

The invention relates to a compact electric motor, and more particularly to a structure of a motor housing with a built-in stator.

Conventionally, small size electric motors such as stepping motor have a housing for accommodating a built-in stator made of, e.g., an aluminum alloy. A conventional electric motor of this type will be described with reference to FIG. 2.

FIG. 2 is a sectional view showing a control valve device using the conventional small size electric motor. In FIG. 2, reference numeral 1 designates a valve body; and 2, a drive unit which is secured to the valve body 1. These components 1 and 2 constitute the control valve device. The valve body 1 is provided with a path 1a for flowing a control fluid and a valve seat 1b confronting a valve piece (described later).

The drive unit 2 includes a stepping motor 4 for rotating a rotor shaft 3, a holder 5 for converting the rotary motion of the rotor shaft 3 into a linear motion, and the valve piece 6 secured to the front end of the holder 5.

The rotor shaft 3 of the stepping motor 4 is rotatably supported by a bearing 8 and a bearing 10. The bearing 8 is arranged on an inner peripheral portion of a housing 7 that is secured to the valve body 1, and the bearing 10 is arranged on an inner peripheral portion of a cover 9 that covers the rear end of the housing 7. The housing 7 is made of metal such as an aluminum alloy. A multipolar magnet 11 is secured around the outer periphery of the rotor shaft 3 by a mold 12 so as to be concentric with the rotor shaft 3. A stator 13 is arranged on the outer peripheral side of the magnet 11. Reference numeral 14 designates a coil of the stator 13; 15, a mold for protecting both the coil 14 and a coil terminal 16; 17, an external connection terminal connected to the coil terminal 16; 18, a packing interposed between the housing 7 and the cover 9; and 19, a spring for preventing the rotor shaft 3 from backlashing in the axial direction, the spring being arranged between the cover 9 and the bearing 10 so as to act resiliently therebetween.

The holder 5, which is substantially cylindrical, is made of a synthetic resin and is supported so as to be inserted into the rotor shaft 3 while passing a portion of the rotor shaft 3 therethrough, the portion projecting from the housing 7. The valve piece 6 is fitted into and secured to an opening on the front end side of the holder 5. The valve piece 6 is also formed of the synthetic resin unitarily. The base portion on the side of the projecting portion of the rotor shaft 3 is provided with a male screw, while the inner peripheral portion of the holder 5 is provided with a female screw that ca be screwed into the male screw. A guide 20 serves to eliminate the rotation of the holder 5 caused by the rotary motion of the rotor shaft 3. The guide 20 is secured to the housing 7. More specifically, when the rotor shaft 3 is rotated by the stepping motor 4, the holder 5 gets screwed into the rotor shaft 3, while held from rotating by the guide 20. As a result, the rotary motion of the holder 5 is converted into a linear motion, so that the holder 5 travels along the length of the rotor shaft 3. A spring 21 that serves to prevent the holder 5 from moving back and forth slightly due to backlash of the screwed portion is interposed between the holder 5 and the guide 20 so that the holder 5 can be urged to the front side (toward the valve seat 1b).

A stopper 22 that serves to regulate the maximum advance position of the holder 5 is held by a stopper ring 23 at a front end of the rotor shaft 3. Reference numeral 24 designates a stopper for regulating the maximum retreat position of the holder 5.

In the control valve device thus constructed, the holder 5 that is screwed into the rotor shaft 3 travels frontward and backward by rotation of the stepping motor 4. This causes the valve piece 6 to move back and forth to change the distance between the valve seat 1b and itself, i.e., the area of the fluid path, thereby controlling the flow rate of the fluid flowing through the path 1a. The maximum advance position of the valve piece 6 is regulated by the abutment of the holder 5 against the stopper 22, while the maximum retreat position thereof is regulated by the abutment of the holder 5 against the stopper 24.

Accordingly, the thus constructed conventional control valve device is disadvantageously heavy in weight. This is because the housing 7 of the stepping motor 4 is made of the aluminum alloy. To overcome the above inconvenience, the housing 7 may be formed of a comparatively lightweight material such as a synthetic resin. However, a change in the material to a synthetic resin creates the problem of radiating heat, generated by energizing the coil 14, outside the device because the heat conductivity of the synthetic resin is low compared with that of a metal.

SUMMARY OF THE INVENTION

A small size electric motor of the present invention includes a motor housing having a built-in stator and secured to a supporting member. The motor housing is made of a synthetic resin and has a substantially tubular heat conductive plate embedded in a portion thereof which is attached to the supporting member. The heat conductive plate is made of a metallic material, and its inner peripheral portion projects toward the inner side of the housing so that the heat conductive plate is brought into contact with the stator. In addition its outer peripheral portion is exposed to the surface to which the supporting member is attached so that the heat conductive plate is brought into contact with the supporting member.

The heat generated by energizing the coil is radiated while transmitted from the stator to the supporting member through the heat conductive plate.

DESCRIPTION OF THE PREFERRED EMBODIMENT

An embodiment of the invention will be described with reference to FIG. 1.

Figure 1:
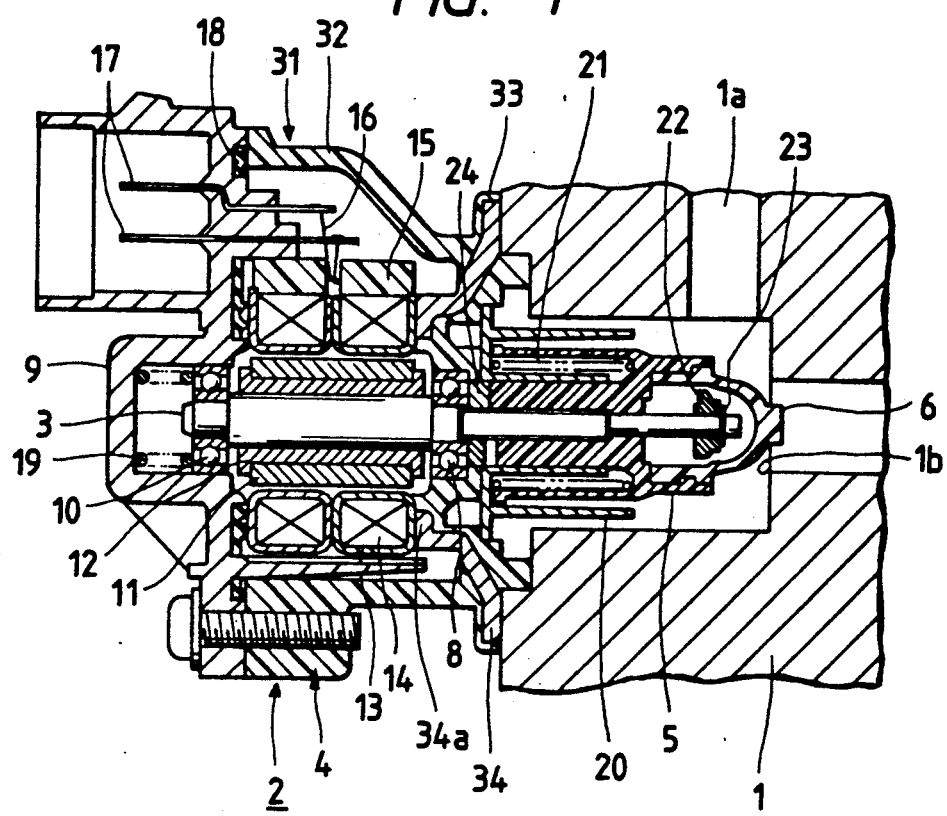
FIG. 1 is a sectional view showing a control valve device using a small size electric motor of the invention.
Figure 2:
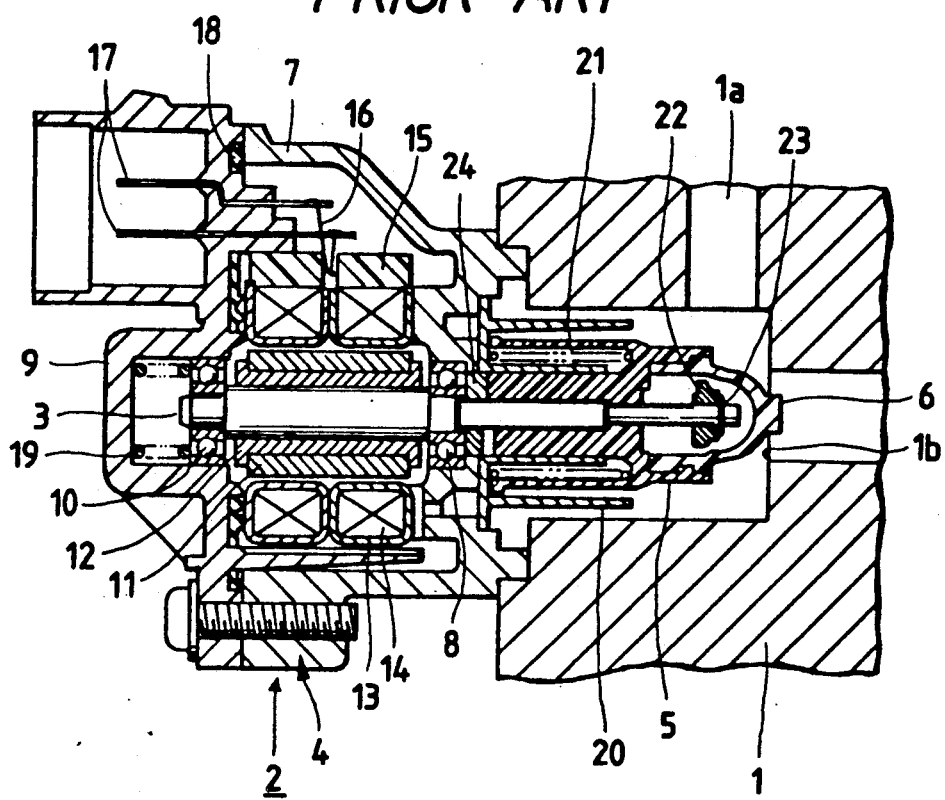
FIG. 2 is a sectional view showing a control valve device using a conventional small size electric motor.

FIG. 1 is a sectional view showing a control valve device using a small size electric motor of the invention. In FIG. 1, same or like members as those described in FIG. 2 will be designated by same reference numerals and the descriptions thereof will thus be omitted. In FIG. 1, reference numeral 31 designates a housing of a stepping motor 4. The housing 31 is formed of a synthetic resin into a predetermined profile monolithically and provided with a frame 2 for supporting a stator 13 and the like, and with an fixing flange 33 to be attached to a valve body 1.

A heat conductive plate 34 is entirely made of a metallic material and has a substantially tubular form. The heat conductive plate 34 is embedded into the fixing flange 33 of the housing 31 by insert molding. The inner peripheral portion of the heat conductive plate 34 is projecting toward the inner side of the housing 31 so as to be asymmetric with respect to the outer peripheral portion thereof in the axial direction. An inner flange 34a is formed at this inner peripheral portion. In insert-molding the heat conductive plate 34, is. not only in exposed to the inner side of the housing 31, at end flange 34a but also an end surface of the outer peripheral portion thereof is exposed to the surface to which the attaching flange 33 is attached.

To assemble the stepping motor 4 of the drive unit 2 by using the housing 31 to which the heat conductive plate 34 has thus been embedded, the stator 13 is caused to come into contact with the portion of the inner flange 34a which is exposed to the inner side of the housing 31. The stator 13, the rotor shaft 3, and the like, are assembled into the housing 31, and the cover 9 is fixed with screws thereafter to complete the assembling of the stepping motor 4. Further, to assemble the control valve device using the stepping motor 4, the holder 5, the valve piece 6, and the like are attached to the rotor shaft 3 of the stepping motor 4 in a manner similar to the conventional technique, and the attaching flange 33 of the housing 31 is coupled to the valve body 1 thereafter. In this operation, the outer peripheral portion of the heat conductive plate 34 embedded into the housing 31 is brought into contact with the valve body 1.

Therefore, the heat generated by energizing the coil 14 is transmitted from the stator 13 to the inner flange 34a of the heat conductive plate 34 and thus radiated to the valve body 1 through this heat conductive plate 34. It is for this reason that the stator 13 can be cooled properly even if the housing 31 is made of the synthetic resin.

Although an example in which the invention is applied to the stepping motor 4 serving as a drive source of the control valve device has been described in the above embodiment, the invention may be applied to any small size electric motor ensuring the same advantage.

As described in the foregoing pages, the small size electric motor of the invention includes a motor housing which has a built-in stator and which is secured to a supporting member, the motor housing being made of a synthetic resin. A portion of the motor housing to which the supporting member is attached has a metal-made, substantially tubular heat conductive plate embedded, and the inner peripheral portion of the heat conductive plate is exposed to the inner side of the housing so that the heat conductive plate is brought into contact with the stator, while its outer peripheral portion is exposed to the surface to which the supporting member is attached so that the heat conductive plate is brought into contact with the supporting member. As a result, the heat generated by energizing the coil is transmitted from the stator to the supporting member through the heat conductive plate and thus is released outside the device. This allows the coil to be cooled properly, thus preventing the temperature of the coil from increasing to a possible extent. Thus, the arrangement that the motor housing is made of a synthetic resin contributes to reducing the weight of the device.

What is claimed is:

1. An electric motor comprising:
    a motor housing having a built-in stator and a supporting member, said motor housing being made of a synthetic resin; and
    a substantially tubular heat conductive plate embedded in a portion of said housing so as to be attached to said supporting member, said heat conductive plate being made of a metallic material, an inner peripheral portion of said heat conductive plate projecting toward the inner side of said housing so that said heat conductive plate is brought into contact with said stator, and an outer peripheral portion of said heat conductive plate being exposed to a surface to which said supporting member is attached so that said heat conductive plate is brought into contact with said surface, for transfer of heat from said heat conductive plate to said surface.

* * * * *